United States Patent [19]

Samuel et al.

[11] Patent Number: 4,549,909
[45] Date of Patent: Oct. 29, 1985

[54] DEXTRINIZED WAXY STARCH OF EXCELLENT CLARITY AND LUSTER IN AQUEOUS SOLUTION AND PROCESS OF MANUFACTURE

[75] Inventors: Raj K. Samuel; Ronald J. Kozlowski, both of Hammond; Frank J. Pustek, Munster, all of Ind.

[73] Assignee: American Maize-Products Company, Hammond, Ind.

[21] Appl. No.: 562,711

[22] Filed: Dec. 19, 1983

[51] Int. Cl.⁴ ............................................. C13L 1/10
[52] U.S. Cl. ..................................... 127/33; 127/39; 127/70
[58] Field of Search ..................... 127/32, 33, 38–40, 127/70, 71, 67; 536/103, 105

[56] References Cited

U.S. PATENT DOCUMENTS

| | | | |
|---|---|---|---|
| 1,937,752 | 12/1933 | Fuller | 127/32 |
| 1,942,544 | 1/1934 | Fuller | 127/38 |
| 1,956,064 | 4/1934 | Edson | 127/33 |
| 2,317,752 | 4/1943 | Fuller | 127/33 |
| 2,354,838 | 8/1944 | Schopmeyer et al. | 127/33 |

*Primary Examiner*—Peter Hruskoci
*Attorney, Agent, or Firm*—Lucas & Just

[57] ABSTRACT

The present invention relates to a process and the product resulting from pretreating corn starch with calcium or sodium hypochlorite in a controlled manner wherein the starch in aqueous slurry at about 90° to about 115° F. is contacted with from about 0.1 to 6.0% chlorine based on the weight of starch to tenderize the starch which is thereafter filtered, washed, dried and dextrinized in conventional manner to produce dextrins having excellent clarity, luster and stability in aqueous solutions containing at least 30% by weight of solids.

9 Claims, No Drawings

DEXTRINIZED WAXY STARCH OF EXCELLENT CLARITY AND LUSTER IN AQUEOUS SOLUTION AND PROCESS OF MANUFACTURE

The present invention is directed to waxy corn starch dextrins that have excellent clarity, luster and stability as compared to conventional dextrins made from non-waxy starches such as the corn starches.

Dextrins are well known starch degradation products extensively used in industry in mucilage, adhesives and in adhesive formulations as for example on stamps and envelopes. Industrial dextrins are characterized as canary dextrins, cream dextrins, white dextrins and British gums.

Degradation of starch to dextrins is conventionally obtained by heating starch alone or by heating starch in the presence of an acid or catalyst. In all cases the starch molecules are reduced in size to the selected degree to provide a relatively fast drying adhesive with good tack. Dextrinization is an art and each manufacturer has its own particular procedures. The degree of degradation of the starch molecules depends on the temperature employed, speed of heating, the time of holding the starch at the selected temperature, and the type and amount of acid or catalyst that is used in the selected dextrinization process.

Dextrins and British gums are typically prepared by heating starch containing about 12.0% moisture content by weight to a temperature of about 200 to about 360° F. or more for a period of time that may range from two to ten and more hours depending on the desired degree of degradation. As a practical matter, degradation of the starch is carried out to the extent that at least about 30% by weight of the dextrinized dry product will be soluble in water. The acid customarily used is hydrochloric acid that is sprayed on the dry starch in an amount of up to about 0.04% hydrochloric acid by weight of starch. Higher amounts of hydrochloric acid may be used in conventional manner and any of the known conventional acids or catalysts such as sodium bicarbonate, sodium phosphate or chlorine gas at a neutral or alkaline pH may be employed.

Root starches and in particular potato and tapioca conventionally provide canary dextrins which in solution have excellent clarity, luster and stability even at concentrations up to 65% by weight of dry solids in water. Canary dextrins derived from waxy corn starch in conventional manner tend to give hazy solutions that do not possess the luster of dextrins derived from potato or tapioca starches.

It has now been discovered that it is entirely possible to produce dextrins from waxy corn starch that give aqueous solutions possessing excellent clarity, luster and stability by pretreating the waxy starch with sodium or calcium hypochlorite. The pretreatment is carried out in controlled manner to provide only mild oxidation which in some way tenderizes or so preconditions the waxy starch that it is readily dextrinized. The resulting waxy starch dextrins provide excellent clarity, luster and stability in aqueous solutions containing up to 65% solids. This was quite unexpected since oxidized starches are known to be sensitive to heat and rapidly turn brown upon heating.

The treatment with sodium or calcium hypochlorite must be controlled within certain limits. Under-oxidation fails to provide the desired clarity and luster and over-oxidation makes dextrinization difficult and the waxy starch tends to become discolored.

In accordance with the present invention controlled oxidation is carried out by adding waxy corn starch granules to water to form a slurry containing from 25 to 40% by weight of starch and for best results from about 30 to 34% waxy starch solids by weight.

The slurry pH is adjusted to about 7.0 and maintained between about at least 8.0 to about 8.5 during treatment by controlling the rate of addition of the hypochlorite solution. The slurry is heated to a temperature of about 90° to about 115° F. and maintained at this temperature by controlled rate of addition of the hypochlorite solution or by heating and cooling if necessary. The reaction is allowed to proceed to completion and thereafter sodium bisulfite is preferably added to destroy any residual chlorine. The treated starch is filtered, washed and dried to about 12% moisture content and then dextrinized.

Maintaining the waxy starch slurry at a pH of at least about 8.0 and above during treatment with hypochlorite within the specified temperature range is an important feature of the present invention. It has heretofore been suggested in U.S. Pat. Nos. 1,937,752 and 1,942,544 that the clarity of dextrins derived from ordinary non-waxy corn starch can be improved by pretreating the non-waxy starch with sodium or calcium hypochlorite in aqueous slurry at a pH of about 7.0 and below. It was discovered, however, that waxy starch because of its different molecular structure tended to cross-link and become gritty when subjected to treatment with hypochlorite at a pH of 7.0 and below. The resulting pretreated waxy starch upon subsequent dextrinization did not result in an altogether satisfactory adhesive product. This problem has now been overcome and in accordance with the present invention the waxy starch does not tend to cross-link or become gritty when the sodium or calcium hypochlorite treatent is carried out in aqueous slurry maintained at a pH of at least about 8.0 and above and within the specified temperature range. The resulting pretreated waxy starch upon dextrinization possessed unexpected clarity, luster and stability in aqueous solution as compared to non-waxy starch pretreated with hypochlorite in accordance with prior suggestions in the art.

In accordance with the present invention, the amount of calcium or sodium hypochlorite added to the slurry is that necessary to provide between about 0.1% to about 6.0% chlorine by weight based on the weight of waxy starch. Best results in clarity and luster of aqueous solutions of the final dextrinized waxy starch is achieved by adding enough sodium hypochlorite to provide between about 0.5% and about 1.0% chlorine by weight of waxy starch. Less than about 0.1% chlorine by weight based on the weight of waxy starch solids is ineffective for removing nitrogen containing impurities from the starch. More than about 6.0% chlorine by weight of waxy starch results in adding carboxyl and carbonyl groups into the starch molecule which make dextrinization very difficult and unsatisfactory. It is believed that removal of some or all of the nitrogen containing impurities from the starch provides the resulting dextrin with its excellent clarity, luster and stability in aqueous solution.

In one typical example of the invention, a water slurry of waxy starch granules containing 30% by weight of starch (dry basis) was heated to 105° F. and the pH of the slurry was adjusted to 7.0 with a 2.0% solution of sodium hydroxide. Sodium hypochlorite containing 15% available chlorine was slowly added at a rate to maintain the slurry at a pH of at least about 8.0 to about 8.5. The amount of sodium hypochlorite solution added to the slurry provided 0.75% of chlorine based on the weight of the waxy starch (dry basis). The temperature of the slurry was maintained between 100° and 110° F. throughout the reaction which was allowed to proceed to completion. Time of treatment was about 3 hours. At the end of reaction, about 100 parts per million of sodium bisulfite were added to destroy any residual chlorine and the pH was adjusted to 4.0. The waxy starch reaction product was filtered from the slurry, washed and dried to about 12% by weight moisture content.

The dried reaction product was sprayed with dilute (15%) hydrochloric acid to bring the pH of the waxy starch to about 3.0. The acidified waxy starch was roasted in a conventional vertical cooker at 335° F. for 8 hours. The resulting canary waxy starch dextrins readily dissolved in cold water at 30 to 65% solids (dry basis) and the solution had luster and excellent clarity. A test solution containing 4% solids by weight transmitted from 73% to 95% of light in the visible spectrum from 500 m$\mu$ to 800 m$\mu$0 through a 1.0 centimeter cell when measured in a conventional spectro-photometer as compared to conventional waxy starch dextrins which have poor clarity and transmit only about 48% to 64% of light under the same test conditions.

It is important for clarity of aqueous solutions to carry out dextrinization of the pretreated waxy starch at a pH not greater than about 3.5. It has been found that dextrinization of the pretreated waxy starch proceeds rapidly at the specified low pH and there is no tendency for the pretreated waxy starch dextrin to take an objectionable color or lose clarity as is likely to occur when the waxy starch is roasted for the long period of time required when the pH is above about 3.5.

The dextrinization of the waxy starch after treatment with calcium or sodium hypochlorite in controlled manner in accordance with the present invention may be carried out in conventional manner at the specified pH to produce any of the conventional dextrins such as the white dextrins, canary dextrins, cream dextrins or British gums. In general, the Brookfield viscosity of these dextrins using a No. 4 spindle at 20 r.p.m. will be from about 2,500 to 9,000 cps. and the dextrin will possess a reducing sugar content below about 6.0. Dilute (1.5–2.0N) hydrochloric acid used in an amount of up to about 0.04% by weight of starch will in general, provide the specified pH of below about 3.5 for dextrinizing the pretreated waxy starch of the present invention but other acids such as monochloroacetic, nitric and phosphoric acids or chlorine may be employed in place of the hydrochloric acid at the specified pH for dextrinization. Best results of clarity, luster and stability of clarity is achieved by dextrinizing the pretreated waxy starch with hydrochloric acid.

Any of the conventional roasting apparatus may be used such as the known bulk cookers, fluidized bed dextrinizers or kiln type cookers. U.S. Pat. No. 3,200,012 describes one form of cylindrical drum roaster and U.S. Pat. No. 3,527,606 describes a paddle type roaster which may be conveniently employed for dextrinizing the pretreated waxy starch. Roasting temperature may range from about 200° F. up to 360° F. and more depending on the type of roaster employed for a period of time of from about 2 up to about 10 hours to obtain a dextrin of desired viscosity. In accordance with the present invention, the final waxy starch dextrin will dissolve in water at ambient temperature to provide a solution containing at least 30% solids and excellent clarity and luster.

While best results in clarity and luster are achieved using unmodified waxy starch in accordance with the present invention, ester or ether modified waxy starch or waxy starch that has been subjected to acid or enzyme hydrolysis may be used as the starting material in carrying out the present invention.

The first Example was repeated as described hereinabove except that calcium hypochlorite was used in place of the sodium hypochlorite. The resulting waxy starch dextrin exhibited comparable clarity and luster in aqueous solution to the waxy starch dextrin produced in the first Example.

It will be understood that it is intended to cover all changes and modifications of the preferred embodiment of the invention herein chosen for the purpose of illustration which do not constitute a departure from the spirit and scope of the invention.

What is claimed is:

1. A process for manufacturing waxy corn starch dextrins which comprises the steps of:
   (a) forming an aqueous slurry of waxy corn starch granules containing from about 25 to about 40% starch solids by weight;
   (b) heating the slurry to a temperature of from about 90 to about 115° F. and adjusting the pH of the slurry to about 7.0;
   (c) adding sodium or calcium hypochlorite to the slurry in an amount to provide from about 0.1 to about 6.0% of chlorine based on the weight of starch solids;
   (d) controlling the rate of addition of said hypochlorite to maintain the pH of the starch slurry between about at least 8.0 and about 8.5;
   (e) maintaining the slurry at a temperature of from about 90 to about 115° F. and at a pH between about 8.0 and about 8.5 during treatment of the starch with said hypochlorite;
   (f) recovering the treated waxy starch granules from the slurry and adjusting the pH of said recovered granules to not over 3.5; and
   (g) heating the granules to dextrinization temperature at a pH of not over 3.5 to convert the waxy starch to dextrin.

2. The process of claim 1 in which the amount of hypochlorite added to the slurry provides from about 0.5 to 1.0% chlorine based on the weight of the waxy starch granules.

3. The process of claim 1 in which dextrinization of the waxy starch granules is carried out at a pH of not greater than about 3.5 and at a temperature between about 200° F. to about 360° F.

4. The process of claim 1 in which sodium bisulfite is added to the slurry at the end of treatment to destroy residual chlorine.

5. The process of claim 1 which includes the steps of filtering the slurry to recover the waxy starch granules which are thereafter washed and dried to moisture content of about 12% by weight before dextrinization with heat.

6. The process of claim 1 which includes the step of washing the waxy starch granules before dextrinization with heat.

7. A waxy corn starch dextrin produced by the process of claim 1 and having a Brookfield viscosity of from about 2,500 to 9,000 cps.

8. A waxy corn starch dextrin produced by the process of claim 1.

9. The waxy corn starch dextrin produced by the process of claim 1 having an improved clarity and luster in aqueous solutions which are capable of transmitting over 73% of light when measured spectrophotometrically between 500 m$\mu$ and 800 m$\mu$ through a 4.0% by weight test solution in a 1.0 centimeter cell.

* * * * *